United States Patent [19]

Hudson et al.

[11] 4,162,726

[45] Jul. 31, 1979

[54] SOD HARVESTING MACHINE HAVING MEANS FOR CONVEYING AND STACKING SOD PADS

[75] Inventors: William W. Hudson; Woodrow W. Wilson, both of Columbus, Ohio

[73] Assignee: Wilson-Miner R & D, Groveport, Ohio

[21] Appl. No.: 817,710

[22] Filed: Jul. 21, 1977

[51] Int. Cl.² ............... B65G 15/04; B65G 47/36; B65G 67/08; A01B 45/04
[52] U.S. Cl. ...................... 198/678; 172/20; 198/693; 414/518; 414/498; 414/502
[58] Field of Search ............ 172/19, 20; 198/678, 198/680, 692, 693; 214/83.14, 515, 519

[56] References Cited
U.S. PATENT DOCUMENTS

| | | | |
|---|---|---|---|
| 2,729,049 | 1/1956 | Porter | 198/693 X |
| 3,580,375 | 5/1971 | Nunes, Jr. | 172/19 X |
| 3,877,584 | 4/1975 | Holcombe | 172/19 X |

*Primary Examiner*—Paul E. Shapiro
*Attorney, Agent, or Firm*—Francis T. Kremblas, Jr.

[57] ABSTRACT

A self-propelled sod harvesting machine includes a cutter head which separates a strip of sod from the ground, an elevator for raising the sod strip on the machine, and a blade assembly for cutting individual sod pads from the strip. A conveyer for the sod pads includes a plurality of spaced apart chains drawn around sprockets and carrying outwardly projecting teeth which penetrate the pads from the top. The teeth are arranged to pinch the sod in a manner to retain it on the conveyer as the individual pads are successively carried to a sod box containing a pallet. A stripping mechanism is lowered in a rocking type stroke to strip the sod pads off of the conveyer teeth and onto the pallet in a stack.

10 Claims, 7 Drawing Figures

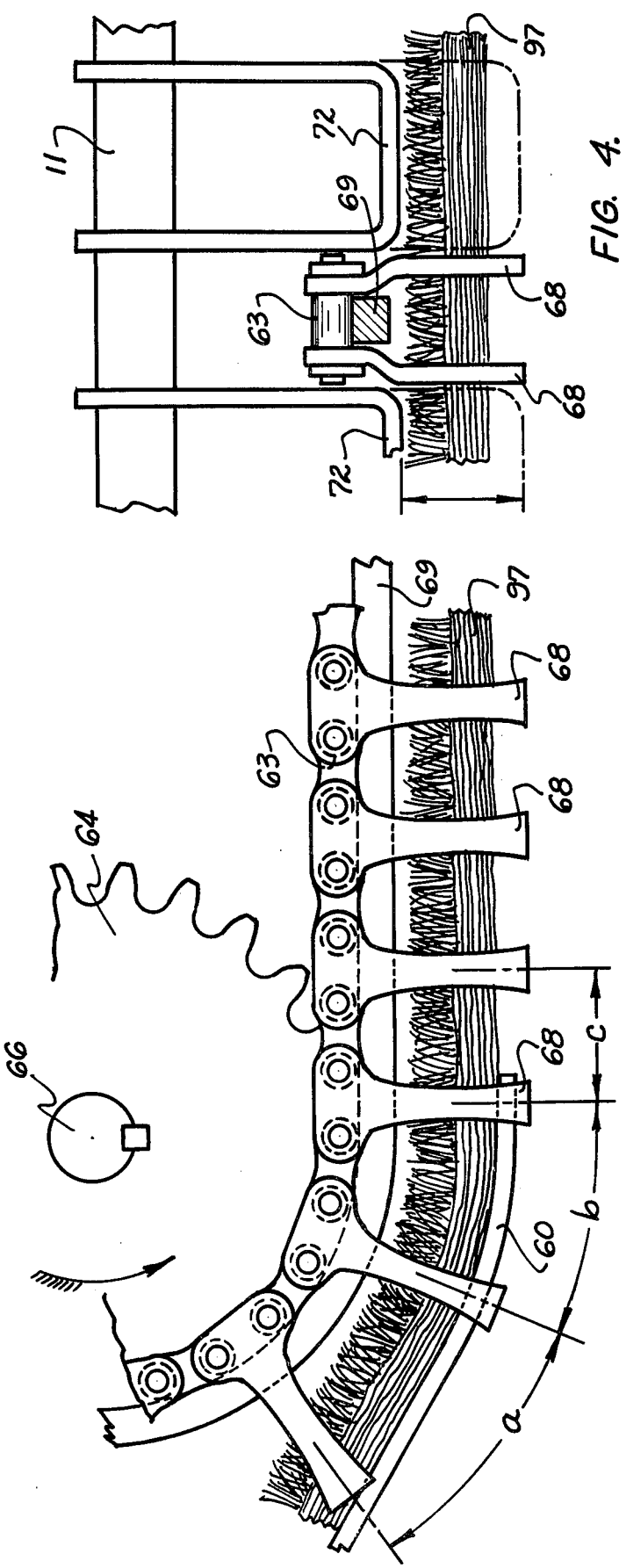

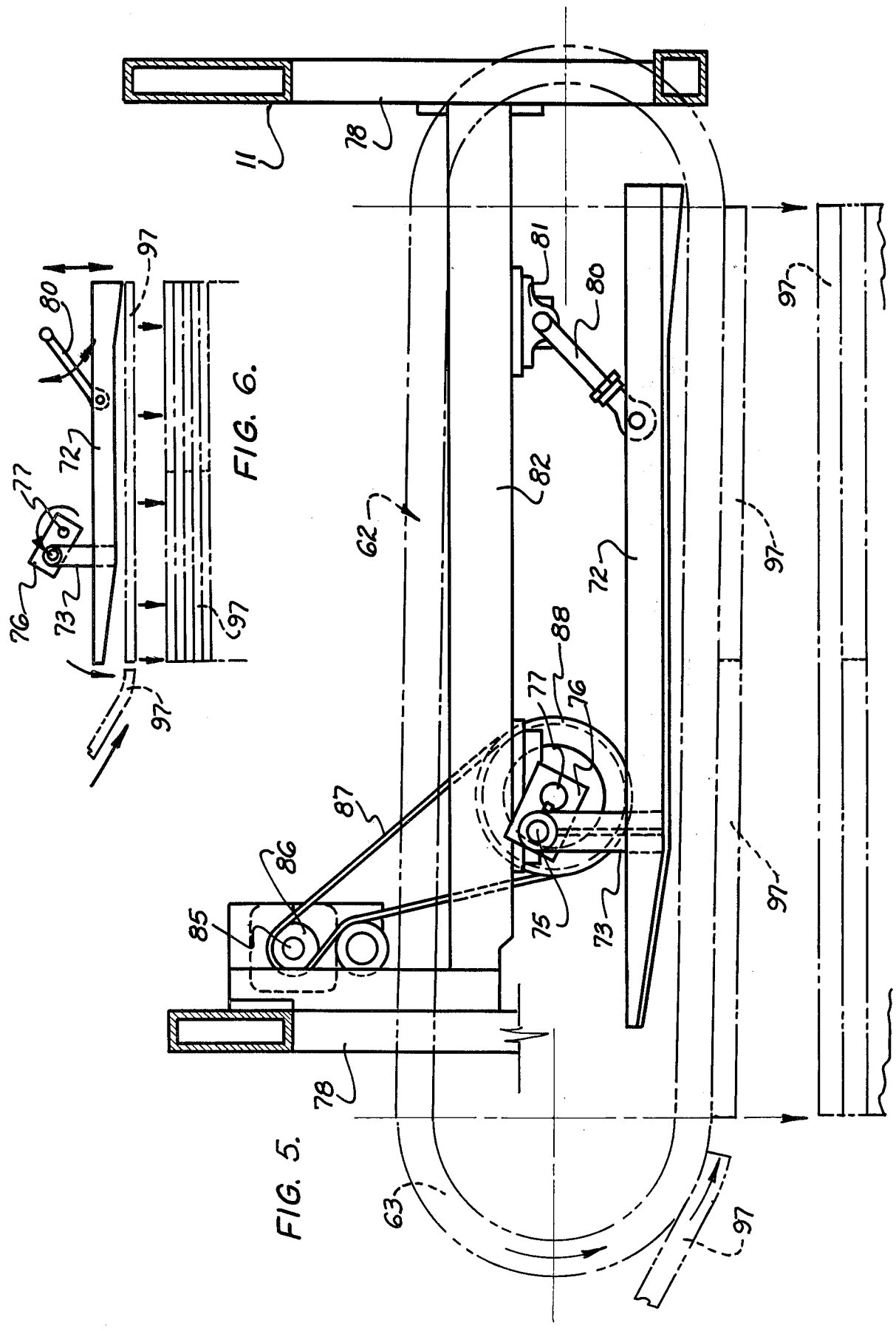

SOD HARVESTING MACHINE HAVING MEANS FOR CONVEYING AND STACKING SOD PADS

BACKGROUND AND SUMMARY OF THE INVENTION

The invention relates generally to the harvesting of sod and deals more specifically with a sod harvesting machine which handles sod in an improved manner.

Although sod harvesting machines have enjoyed considerable popularity, they have not been wholly satisfactory in all respects. Typically, such machines include a cutting head that acts to separate an elongated strip of sod from the ground. The sod strip is then elevated on the machine to a cutting station where it is cut into individual sod pads. It is common for the individual pads to then be manually stacked on pallets which, as can be easily appreciated, requires a considerable amount of manual labor. This of course raises the cost of the sod harvesting operation substantially, as well as severly restricting the speed with which the machine can operate.

Various types of conveyors and sod stacking mechanisms have been proposed in attempts to overcome these difficulties. For the most part, however, such proposed devices have not been successful. Perhaps most importantly, an operating speed high enough to make the machine efficient in handling sod has not been achieved with the conveyers and stacking devices that have been proposed. Moreover, these devices have been overly complicated and costly to manufacture, and they have been lacking in reliability. Such equipment has also been susceptible to jamming with dirt, rocks, and other materials, thereby increasing the maintenance requirements and down time of the machine.

The present invention is aimed principally at eliminating these difficulties by providing a unique conveyer assembly which functions in cooperation with a stripping mechanism to stack sod pads in automatic fashion. After each sod pad has been cut on the machine in the desired shape and delivered to a pickup station, parallel conveyor chains carrying outwardly projecting teeth pass over the pad. The teeth are arranged to enter the sod from the top and to pinch it in a manner to pick up the pad and carry it along the conveyer to a sod box located at the back end of the machine. The stipping mechanism is then activated to discharge the pads from the conveyer and stack them on a pallet located in the sod box.

It is important object of the invention to provide, in a sod harvesting machine, a conveyer assembly which functions in an improved manner to carry individual sod pads into position to be stacked on a pallet.

Another object of the invention is to provide a conveyer assembly of the character described that includes driven chains carrying teeth which penetrate the sod pads from the top thereof in order to pick up and convey the pads. This arrangement allows the machine to operate continuously at a high rate of speed since the conveyer is above the sod pads and need not be withdrawn as is necessary with conveyers that underlie the sod. As an additional benefit, the penetration of the sod by the conveyer teeth provides aeration holes which help to preserve the condition of the sod.

Yet another object of the invention is to provide a conveyer assembly of the character described wherein the teeth are automatically caused to pinch together in order to firmly hold the sod as it is carried on the chain conveyer. This important feature is achieved by passing the chain around a sprocket in the area where the conveyer teeth enter the sod.

A further object of the invention is to provide, in combination with a conveyer of the character described, a unique stripping mechanism for discharging the sod pads from the conveyer teeth and stacking them on pallets.

An additional object of the invention is to provide a stripping mechanism which is driven in a sweeping or rocking motion to strip the sod pads from the conveyer teeth smoothly and effectively without interfering with the operation of the continuously running chain conveyer. This sweeping or rocking motion is important in that it results in raising of the forward end of the stripping mechanism in sufficient time to allow the succeeding sod pad to be quickly carried on the conveyer into position above the pallet. Furthermore, the forward end of the stripping mechanism is carried rearwardly during the stripping stroke so that even more clearance is provided to accomodate the next pad. An additional advantage resides in the smooth "peeling" action with which the sod pad is stripped off of the teeth since the stripping mechanism is moving slightly to the rear or in the same direction as the sod pads.

A still further object of the invention is to provide a conveyer assembly and stripping mechanism which may be economically manufactured, which are able to operate at a high speed, which are rugged and durable in operation, and which function automatically in order to eliminate the necessity of manual labor.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith, and in which like numerals are employed to indicate like parts in the various views:

FIG. 3 is a fragmentary side elevational view on an enlarged scale illustrating one of the chains in the conveyer and the manner in which the teeth carried on the conveyer chain penetrate the sod pads in order to pick up and carry them;

FIG. 4 is a fragmentary view in section through the conveyer chain shown in FIG. 3, with the broken lines indicating movement of the stripping mechanism of the machine to a stripping position wherein the sod pad is stripped off of the conveyer teeth;

FIG. 5 is a side elevational view illustrated diagrammatically the arrangement of the stripping mechanism and its relationship to the chain conveyer;

FIG. 6 is a schematic diagram illustrating the arrangement and motion of the stripping mechanism shown in FIG. 5.

Figure 1:
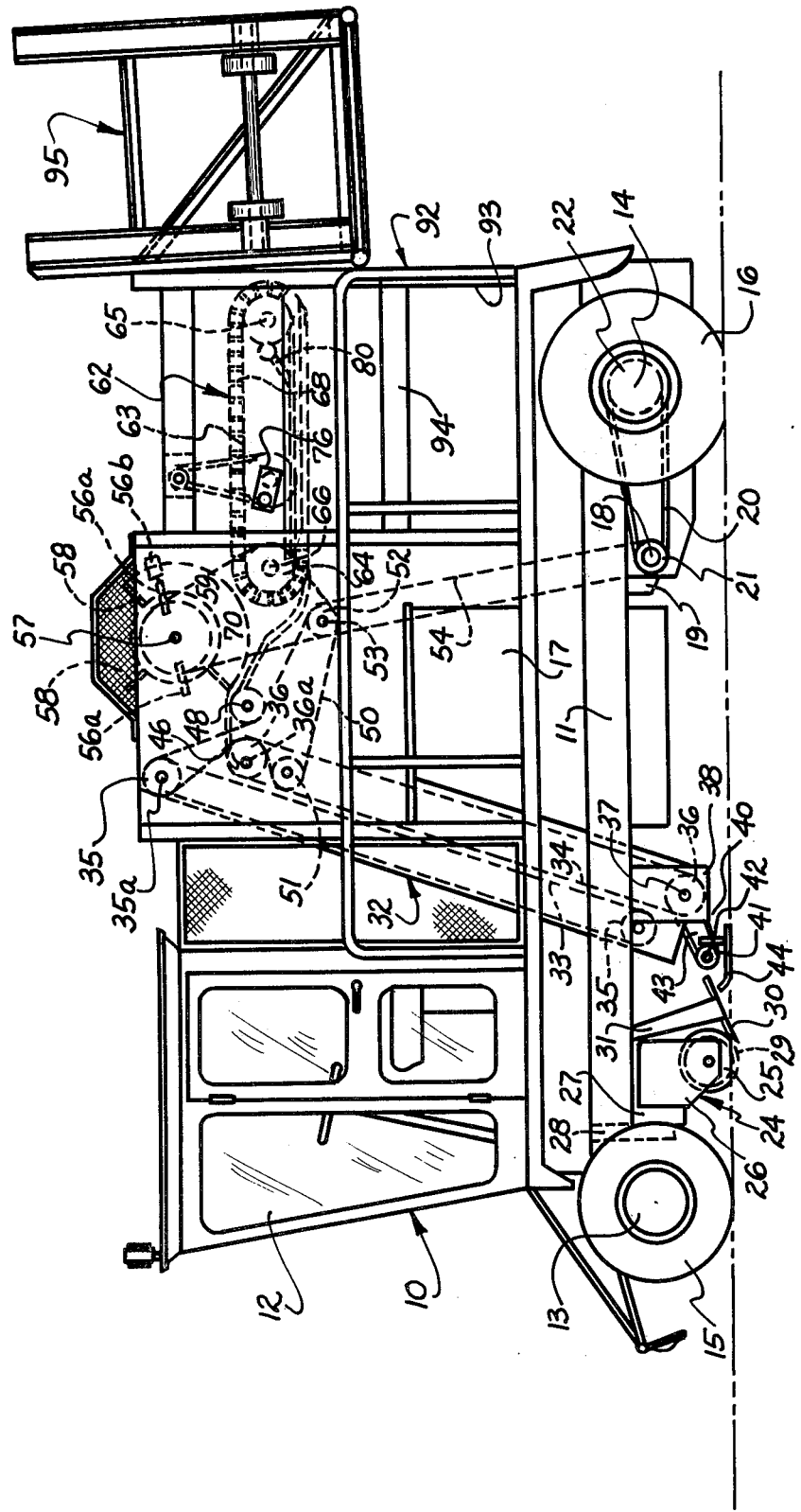
FIG. 1 is a side elevational view of a sod harvesting machine constructed in accordance with a preferred embodiment of the present invention, with broken lines illustrating certain internal details of the machine.

Referring initially to FIG. 1, reference numeral 10 generally designates a sod harvesting machine constructed in accordance with the invention. The machine includes a frame 11 on which an enclosed operator's cab 12 is mounted. The frame 11 has a front axle 13 and a rear axle 14 on which are mounted a pair of front wheels 15 and a pair of rear wheels 16, respectively. The machine is powered by a conventional diesel engine 17 which drives a drive shaft 18 through a transmission 19. A drive chain 20 is drawn around a sprocket 21 carried on shaft 18 and also around a larger sprocket 22 carried on the rear axle 14, thereby driving the rear wheels 15.

A cutter head assembly 24 is carried on the frame in a manner to separate a sod strip from the ground. The cutter head includes a ground engaging drum 25 supported for rotation in extension between a pair of mounting plates 26. The plates 26 are in turn mounted on a carriage 27 which is able to ride up and down on a frame in order to raise and lower the cutter head. Disc shaped cutters 29 are carried on each end of drum 25 in a manner to penetrate the ground to define the width of the sod strip that is cut.

The cutter head assembly also includes a cutting blade 30 which has a sharp forward edge and which is carried on the lower end of arms 31. The upper ends of arms 31 are pivotally connected with the frame so that blade 30 can be oscillated back and forth to increase its effectiveness in separating the sod strip from the ground. Blade 30 is long enough to extend between the vertical slits made by cutters 29, and its sharp edge is held at a depth below the ground according to the desired thickness of the sod.

An elevator assembly 32 mounted on the frame 11 includes two sets of chains 33 and 34 between which the sod strip travels. The upper set of chains 33 are spaced apart from one another and are trained around pairs of sprockets 35 supported on the frame for rotation. Similarly, the lower set of spaced apart chains 34 are trained around sprockets 36. The lower sprockets 36 are mounted on a common rotatable shaft 37 extending between mounting plates 38 secured to the frame.

The sod is delivered from blade 30 to the elevator 32 along a set of parallel chains 40 which are trained around sprocket 41 and also around larger sprockets (not shown) which are carried on shaft 37. The forward sprockets 41 are mounted on a shaft 42 which extends between a pair of arms 43. The arms 43 are pivoted to the frame at their rearward ends and are provide with skids 44 which ride along the ground in a manner to maintain chains 40 in the proper position and orientation.

After passing out from between the chains 33 and 34 of elevator 32, the sod strip is delivered onto a plurality of spaced apart plates 46 which are mounted on the frame to extend generally horizontally from the area of sprockets 36 to the upper surface of a cylindrical drum 47 mounted rearwardly of sprockets 36 on a horizontal shaft 48. A sprocket 49 is carried on one end of shaft 48 and receives chain 50 which is also drawn around sprockets carried on the shafts 35a and 36a on which the respective sprockets 35 and 36 are mounted. Chain 50 is also trained around an idler sprocket 51 and a sprocket 52 mounted on a shaft 53. Shaft 53 additionally carries a sprocket around which a chain 54 is trained, the chain 54 is also being drawn around a sprocket carried on the shaft 18.

The drive arrangement drives drum 47 in a clockwise direction as viewed in FIG. 1 and at a rate of speed that is related to the ground speed of the machine or with the rate of travel of the sod strip through the machine. Similarly, the lower flight of elevator chain 33 and the upper flight of chain 34 are driven upwardly by the drive system at equal speeds which correspond with the vehicle speed. The drive system is preferably arranged such that chains 33 and 34 maintain the sod strip under slight tension between the cutter head 24 and the elevator 32 in order to prevent slack or jamming of the strip.

Mounted above and to the rear of drum 47 is a cutting drum 56 which is carried on a horizontal shaft 57 supported on the frame for rotation. Drum 56 carries three cutting blades 58 oriented parallel to shaft 57 in outward projection from the drum and spaced apart at 90 degree intervals. Blades 58 are long enough to cut through the sod strip across its entire width. A fourth semicircular blade 59 carried on drum 56 is located midway along the length of the drum in extension halfway around its circumference between two of the diametrically opposed blades 58.

The end drum 56 carries a pair of pins 56a which are located at diametrically opposed positions such that one of the pins contacts a switch 56b each time drum 56 makes a half a revolution. The switch 56b is a solenoid switch that functions in a manner that will be explained in more detail.

Figure 2:
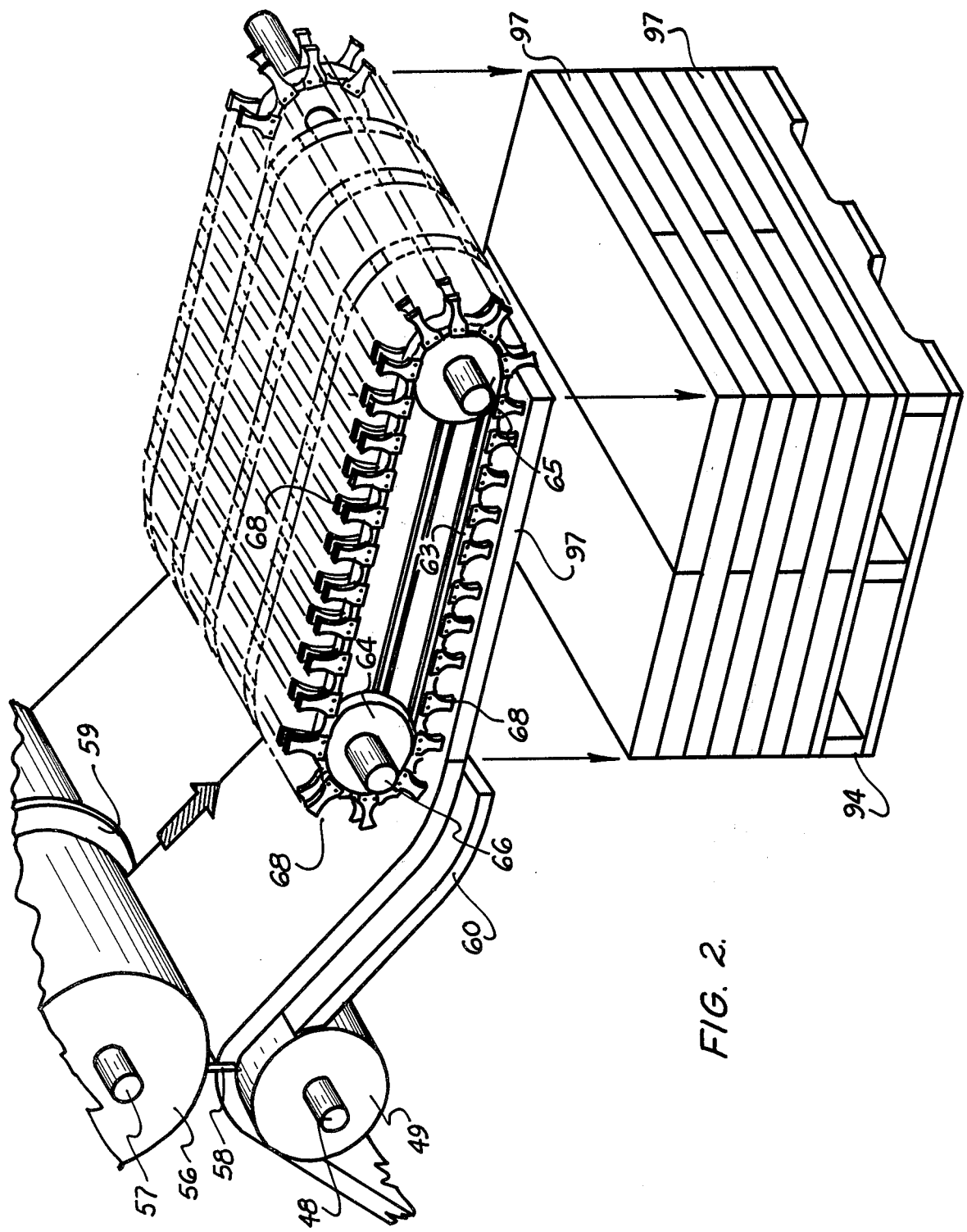
FIG. 2 is a fragmentary diagrammatic view in perspective illustrating schematically the sod conveyer employed on the machine and the manner in which sod pads are conveyed and stacked on the machine.

The arrangement of blades 58 and 59 is such that the sod strip is cut alternatively into a pair of side by side rectangular sod pads having their long axis oriented perpendicular to the longitudinal axis of the sod strip, followed by another pair of side by side rectangular pads oriented with their long axis parallel with the longitudinal axis of the strip. This is best illustrated in FIG. 2.

After being cut from the strip, the sod pads move off of drum 47 onto a chute 60 mounted on the frame at a location adjacent to drum 47 and extending downwardly and rearwardly therefrom. Chute 60 has a curved lower portion which is slightly concave upwardly. The pads are able to slide down the chute and are assisted in such movement by the impetus provided by blades 58 which, due to the location of drum 56 relative to drum 47, are moving in a downward and rearward direction at the time they cut the sod. Consequently, the blades push the edges of the severed sod pads onto and down chute 60.

In accordance with the present invention, the sod pads are successively picked up and carried on a chain conveyer which is generally designated by reference numeral 62. With additional reference to FIGS. 2-4, the conveyer 62 includes a plurality of endless flexible roller chains 63 which are spaced apart from one another in parallel relationship and which are trained around sprockets 64 and 65 at the forward and rearward ends, respectively. The forward sprockets 64 are mounted on a common shaft 66 which is journalled on the frame at a location above the rearward edge of chute 60. The rearward sprockets 65 are likewise journalled for rotation on the frame. The lower run of each chain 63 is horizontal and is located at an elevation slightly above the bottom of the chute.

Each chain 63 carries a plurality of outwardly projecting teeth 68 which are spaced equidistantly apart from one another along the length of the chain. Each tooth 68 is welded or otherwise rigidly secured to its chain 63 in an orientation maintaining the tooth at a right angle to the chain. Consequently, the teeth on the curved portions of the chains which are trained around sprockets 64 diverge with respect to one another as they extend outwardly away from the chain. Such divergence results from the curved shape of each chain as it passes around the sprocket, as best shown in FIG. 3. The outer tips of adjacent teeth thus move closer together as the chain portion on which they are carried moves from the curved area around sprocket 64 to the straight lower run of the chain.

It has been found that teeth of various shapes function satisfactory and that some teeth are employed more advantageously than others depending upon the soil conditions and the type of sod that is being handled. Thus, the teeth may be simple straight fingers or rods, they may be rectangular, square, hexagonal or round in cross section, or they may be any other suitable shape. As best shown in FIG. 4, the teeth 68 are preferably arranged in pairs carried on the opposite sides of each chain 63. A support bar 69 connected with the vehicle frame underlies each chain to support it and maintain its lower run in a horizontal orientation.

Conveyer 62 is driven by a chain 70 which is trained around a sprocket mounted on shaft 66. Chain 70 is also drawn around a sprocket carried on shaft 53 and another sprocket carried on shaft 57. Consequently, the straight lower run of each chain 63 is driven rearwardly at a rate corresponding to the speed with which the sod strip moves through the machine. In addition, drum 56 is driven in a counterclockwise direction at a speed corresponding to the speed with which the sod strip moves past its cutting blades.

Figure 7:
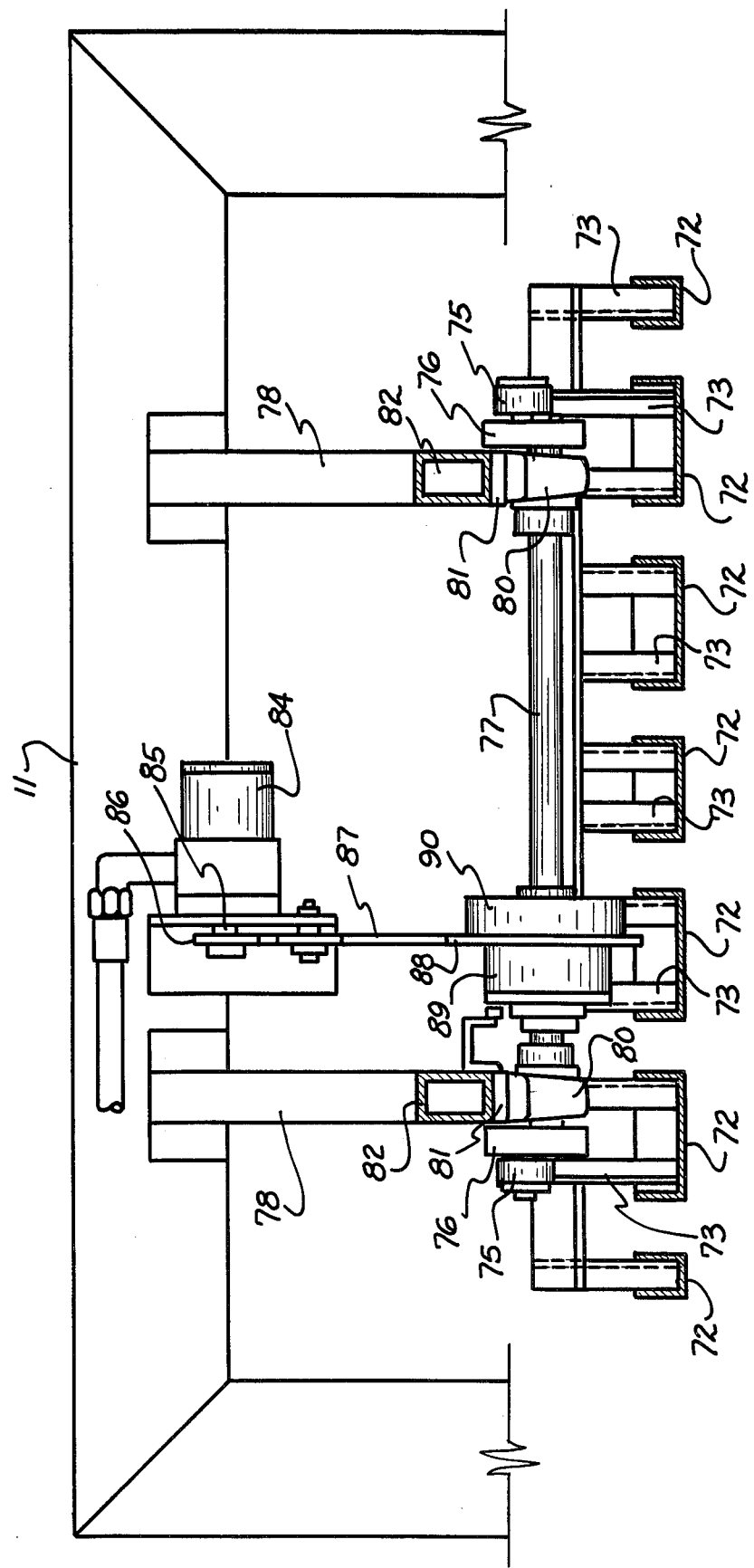
FIG. 7 is a fragmentary front elevational view of the stripping mechanism shown in FIG. 5.

A stripping mechanism which strips the sod pads off of the conveyer teeth 68 includes a plurality of stripper bars 72 which are parallel to one another and which are normally maintained in a horizontal position above the sod pad carried on conveyer 62, as shown in FIG. 1. With additional reference to FIGS. 5-7, each bar 72 is preferably in the form of a channel section (see FIG. 7). The forward end portion of each bar 72 is mounted on the lower end of a vertical support link 73. The links 73 are interconnected at their upper ends by an angle member 74 (FIG. 7) with the links 73 and angle 74 being pivotally coupled at 75 with the outer end of a crank arm 76. At its inner end, arm 76 is rigidly connected with a horizontal cross shaft 77 which is journalled for rotation on frame members 82 forming part of the vehicle frame.

The shaft 77 extends across the width of conveyer 62 at a location to the rear of sprockets 64 and above the lower runs of chains 63, as shown in FIG. 1. The stripper bars 72 are located generally between the respective conveyer chains 63 and are able to pass downwardly therebetween to a location at or below the lower tips of teeth 68 in response to rotation of shaft 77. Each bar 72 is preferably tapered at its front end and of increased thickness at its rearward end.

With reference to FIG. 5 in particular, the rearward end portion of the frame assembly of bars 72 is pivoted to the lower end of a rocker arm 80, which is received at its upper end by a bearing 81 mounted to frame member 82. There are two parallel rocker arms 80, one located near each side of the stripper bar framework.

Shaft 77 is driven rotatively by a hydraulic motor 84 which is mounted on the frame and which drives an output shaft 85 carrying a sprocket 86. The sprocket 86 receives a chain 87 that is also trained around a larger sprocket 88 located between and connected with a clutch 89 and a flywheel 90, all of which are mounted on shaft 77. When switch 56b is engaged by one of the pins 56a, clutch 89 is engaged such that shaft 77 is driven through one revolution, after which the clutch is disengaged.

Referring again to FIG. 1, the stripping mechanism and sod conveyer are located above a sod box 92 formed on the rearward end of the vehicle frame. The sod box 92 includes a pallet elevator 93 which is able to receive a wooden pallet 94 and to successively lower the pallet in stages as sod pads are stacked thereon. The pallet on elevator 93 is located beneath the stripping mechanism in order to receive in a stack the sod pads that are stripped off of coveyer 62. Located on the rear end of the machine is a pallet rack 95 which carries a stack of pallets and includes a pallet transfer mechanism which acts to transfer pallets from the stack onto the elevator 93 after a full pallet containing a stack of sod pads has been discharged from the elevator onto the ground. The pallet elevator and transfer mechanism may be of any desired construction, and they will not be described in detail since they are not a part of the present invention.

In operation, the engine propels the sod harvesting machine along the ground with the cutter head lowered to a depth such that blade 30 and cutters 29 separate from the ground an elongated ribbon or strip of sod having the desired thickness. The sod strip passes over blade 30, along chains 40, upwardly along elevator 32 between chains 33 and 34, and onto plates 46 and drum 47 where it encounters the cutting drum 56. The cutting blades 58 and 59 cut through the sod strip to form individual sod pads which are identified by numeral 97.

Although the arrangement of the blades on drum 56 results in rectangular sod pads which are arranged side by side in pairs having their long axis oriented alternately parallel to and perpendicular to the sod strip, it is to be understood that pads of various sizes, shapes, and orientations may be handled by the machine. For example, with a strip 40 inches wide, the pads may be 40 inches square, they may be 40 inches by 20 inches as illustrated in FIG. 2, or they may be any other desired size.

In any event, the individual pads formed successively by the cutting blade assembly slide down chute 60 and onto the concave lower portion thereof. As best shown in FIG. 3, the conveyer teeth 68 carried on the curved portions of chains 63 which pass around sprockets 64 initially penetrate the pad from the top thereof when the pad reaches the pickup station on chute 60. The teeth are driven through the pad and thus convey it to the rear. Since the teeth initially penetrate the sod are on the curved portion of the conveyer chains, adjacent teeth diverge and their outer tips automatically move closer together as they move from the curved portions of the chains to the straight lower runs of the chains. For example, it is pointed out that the dimension "a" in FIG. 3 between the outer tips of the teeth on the curved chain portion is greater than the dimension "b" which is in turn greater than the dimension "c" between the tips of the teeth on the straight portion of the chain. Consequently, the sod is gradually pinched between adjacent teeth and this pinching effect holds the sod pads firmly on the conveyer 62.

The sod pads are thus carried along conveyer 62 until they reach a location directly above the pallet 94, which location is directly below the stripper bars 72. When the pad reaches this location, one of the pins 56a contacts switch 56b which causes engagement of clutch 89, thereby rotating shaft 77 one revolution and driving the stripping mechanism through one cycle.

With particular reference to FIG. 6, the crank and rocker arm linkage which mounts the stripping mechanism effects a rocking or sweeping type stroke of same to strip the pads from conveyer 62. As shaft 77 is rotated counterclockwise from the FIG. 6 position, arm 76 is lowered to drop the forward end of the stripper bar assembly. As this occurs, the rearward end portion of the stripper bar assembly is initially raised from the FIG. 6 position is then lowered and rocked to the rear on rocket arm 80. Consequently, the forward end of each stripper bar 72 is dropped before the rearward end, and the forward end thus first contacts the sod pad.

As the stripping mechanism is driven through its stripping stroke, the front end portion of each bar 72 is dropped to or below the lower tips of the teeth 68, followed by dropping of the rearward end portion of each bar to or below the teeth. Accordingly, the mounting arrangement of the stripping mechanism carries the front end portion of each bar in a rearwardly direction as it contacts the sod, and the rearward end portion of each stripper bar is likewise moved rearwardly as it initially contacts the sod.

The sod pads are thus successively stripped off of teeth 68 in a rocking or sweeping type stroke of the stripping mechanism which "peels" the sod from the teeth in manner to avoid contacting the entire length of the pad simultaneously jarring or jointing of the pads, and there are also no excessive forces applied to the machine components. Further, the stripper bars are moving generally in the same direction as the sod pads are being conveyed so that a smooth stripping action is provided which allows the chain conveyer to operate continuously at a high speed without opposition or interference from the stripper bars.

The pads which are successively conveyed along conveyer 62 and successively discharged therefrom by the stripping mechanism drop onto the underlying pallet 94, where they are stacked. After the pallet has received a complete stack of pads, it is discharged onto the ground from elevator 93, and an empty pallet is inserted onto the top portion of the elevator from the pallet rack to receive the next stack of pads.

The upward or final part of the stroke of the stripper mechanism, after it has stripped the sod pad, raises the forward end portion of each bar 62 above the teeth 68 before the rearward end is raised. The forward end portions of the stripper bars are thus quickly raised out of the way so that the next sod pad can be immediately moved along conveyer 62. Consequently, the machine is able to operate continuously with the sod pads remaining adjacent to one another as they are carried on conveyer 62. The tapered shape of the forward end of each stripper bar 72 also contributes to clearing it from the path of the succeeding pad as early as possible.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. In a machine for handling sod pads, the combination of:
   a frame:
   a conveyer supported on said frame for movement along a conveyer path:
   means for driving said conveyer along said conveyer path:
   a plurality of teeth carried on said conveyer at locations to penetrate the sod pads from the top in a manner to successively carry the pads along said conveyer path; and
   means for discharging the sod pads from said teeth at a preselected location along said conveyer path including a stripper member for stripping the sod pads off of said teeth:
   means mounting said stripper member on the frame for movement along a stripping path carrying said stripper member against a sod pad disposed at a preselected location to strip the pad off of said teeth, said stripper member having a raised position located substantially above the teeth; and
   power means operable to drive said stripper member along its stripping path when a sod pad reaches said preselected location, and to move said stripper member to its raised position after the pad has been stripped off of said teeth.

2. The combination set forth in claim 1 wherein each of said teeth has an outer tip for penetrating the sod and said conveyer includes means for moving the outer tips of adjacent teeth toward one another after having penetrated the sod to thereby pinch the sod between adjacent teeth.

3. The combination set forth in claim 1 wherein said conveyer includes:
   a curved portion arranged at a location wherein the teeth carried thereon initially penetrate the sod: and
   a relatively straight portion succeeding said curved portion along said conveyer path;
   whereby adjacent teeth pinch the sod therebetween in response to movement of the teeth from said curved portion to said relatively straight portion of the conveyer.

4. The combination set forth in claim 1, wherein said conveyer includes:
   a flexible conveyer member carrying said teeth in outward projection therefrom and driven along said conveyer path by said drive means; and
   a curved support element for said conveyer member mounted on the frame, said conveyer member being arranged with a curved portion extending along said support element and a relatively straight portion succeeding said curved portion along said conveyer path, said support element being arranged at a location wherein the teeth carried on said curved portion initially penetrate the sod.

5. The combination set forth in claim 1, wherein: said stripper member has a first end portion and a second end portion located downstream from said first end portion with respect to said conveyer path; and said mounting means includes a linkage arranged to carry said stripper member along said stripping path in a manner to contact the sod with said first end portion prior to contact of said second end portion with the sod.

6. The combination set forth in claim 5, wherein said linkage is arranged to carry said stripper member along said stripping path in a manner to raise said first end portion above said teeth prior to raising said second end portion above said teeth.

7. The combination set forth in claim 6, wherein said linkage is arranged to carry said first end portion of the stripper member downstream of said conveyer path during a portion of said stripping path.

8. The combination set forth in claim 1, wherein: said stripper member has a first end portion and a second end portion located downstream of said first end portion with respect to said conveyer path: and said mounting means includes a linkage arranged to carry said first end portion of the stripper member downstream of said conveyer path during a portion of said stripping path.

9. The combination set forth in claim 1, wherein: said stripper member has a first end portion and a second end portion located downstream from said first end portion with respect to said conveyer path: and said mounting means includes a crank linkage mounting said first end portion on the frame and a rocker arm mounting said second end portion on the frame for rocking movement, said crank linkage and rocker arm cooperating to carry said stripper member along its stripping path in a manner to contact the sod with said first end portion prior to contact of said second end portion with the sod, and to raise said first end portion above said teeth prior to raising of said second end portion above said teeth.

10. In a machine for handling sod pads, the combination of: a frame: a conveyer supported on said frame for movement along a conveyer path including a plurality of spaced apart conveyer members each carrying a plurality of teeth disposed at locations to penetrate the sod pads from the top in a manner to successively carry the pads along said conveyer path: means for driving said conveyer along said conveyer path: means for discharging the sod pads from said teeth at a preselected location along said conveyer path, said last mentioned means including a plurality of stripper members for stripping the sod pads off of said teeth; means mounting each stripper member on the frame for movement along a stripping path carrying the respective stripper members between said conveyer members and against a sod pad disposed at said preselected location to strip the pad off of said teeth: and power means for driving each stripper member along its stripping path.

* * * * *